US 11,360,789 B2

(12) United States Patent
Ringlein et al.

(10) Patent No.: US 11,360,789 B2
(45) Date of Patent: Jun. 14, 2022

(54) CONFIGURATION OF HARDWARE DEVICES

(71) Applicant: International Business Machines Corporation, Armonk, NY (US)

(72) Inventors: Burkhard Ringlein, Bülach (CH); Francois Abel, Rueschlikon (CH); Beat Eugen Weiss, Edlibach (CH)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 16/921,539

(22) Filed: Jul. 6, 2020

(65) Prior Publication Data

US 2022/0004397 A1    Jan. 6, 2022

(51) Int. Cl.
G06F 9/44     (2018.01)
G06F 9/445    (2018.01)
G06F 15/78    (2006.01)

(52) U.S. Cl.
CPC ...... *G06F 9/44505* (2013.01); *G06F 15/7892* (2013.01)

(58) Field of Classification Search
None
See application file for complete search history.

(56) References Cited

U.S. PATENT DOCUMENTS

| | | |
|---|---|---|
| 7,363,260 B1 | 4/2008 | Stamler et al. |
| 7,584,345 B2 | 9/2009 | Doering |
| 7,941,777 B1 * | 5/2011 | Young ............ G06F 30/34 716/126 |
| 10,171,169 B2 | 1/2019 | Frankel et al. |
| 10,275,558 B2 | 4/2019 | Tamir |

(Continued)

FOREIGN PATENT DOCUMENTS

WO    2016168033 A1    10/2016

OTHER PUBLICATIONS

"Amazon Web Services To Launch Its Own Public Container Registry", Downloaded Jan. 5, 2022, 2 Pgs. <https://www.techzine.eu/news/devops/51682/amazon-web-services-to-launch-its-own-public-container-registry/>.

(Continued)

*Primary Examiner* — Keshab R Pandey
(74) *Attorney, Agent, or Firm* — Peter K. Suchecki (57) ABSTRACT

Methods are provided for configuring a reconfigurable hardware device to execute a user application. Such a method includes providing static shell logic on the device. The static shell logic is controlled by a primary management core for managing operation of the device, and has a predetermined hardware interface. The method includes configuring on the device, via the primary management core, dynamic shell logic for implementing dynamically-selected shell functionality. The dynamic shell logic includes a secondary management core, adapted to communicate with the primary management core via the hardware interface, for managing operation of the dynamic shell logic. The method further comprises configuring on the device, via the primary management core, application logic, having an interface with the dynamic shell logic, for executing the user application. The secondary management core uploads to the primary management core dynamic code to adapt the primary management core for use with the dynamic shell logic.

18 Claims, 8 Drawing Sheets

(56) References Cited

U.S. PATENT DOCUMENTS

| | | | |
|---|---|---|---|
| 10,833,955 | B2 | 11/2020 | Isci et al. |
| 2002/0141449 | A1 | 10/2002 | Johnson |
| 2006/0242649 | A1 | 10/2006 | Gurevich |
| 2007/0156549 | A1 | 7/2007 | Tran |
| 2015/0193233 | A1 | 7/2015 | Eberle et al. |
| 2016/0202999 | A1 | 7/2016 | Van Den Heuvel |
| 2017/0123394 | A1* | 5/2017 | Oliverio ............... G06F 15/7871 |
| 2019/0155669 | A1 | 5/2019 | Chiou |
| 2019/0187718 | A1 | 6/2019 | Zou |
| 2019/0190847 | A1 | 6/2019 | Burger et al. |
| 2020/0257566 | A1 | 8/2020 | Ganguli et al. |
| 2021/0182052 | A1* | 6/2021 | Li ............................ G06F 21/57 |
| 2021/0303352 | A1 | 9/2021 | Diamantopoulos et al. |

OTHER PUBLICATIONS

"Compute, Storage, and Networking Extensions", Downloaded Jan. 5, 2022, 10 Pgs. <https://kubernetes.io/docs/concepts/extend-kubernetes/compute-storage-net/device-plugins/>.

Canziani et al., "An Analysis of Deep Neural Network Models for Practical Applications", Apr. 14, 2017, 7 pages.

Diamantopoulos et al., "A System-level Transprevcision FPGS Accelerator for BLSTM with On-Chip Memory Reshaping", 2018 International Conference on Field-Programmable Technology (FPT), Dec. 10-14, 2018, 4 pages.

Diamantopoulos et al., "Optimizing Container Executions With Network-Attached Hardware Components of a Composable Disaggregated Infrastructure," U.S. Appl. No. 17/648,573, filed Jan. 21, 2022.

Jones, "Reducing Your Docker Image Size", Downloaded May 6, 2021, 6 Pgs., <https://www.cloudbees.com/blog/reduce-docket-image-size/>.

Koeplinger et al., "Spatial: A Language and Compiler for Application Accelerators", PLDI'18, Jun. 18-22, 2018, 16 pages.

List of IBM Patents or Patent Applications Treated as Related, Feb. 2, 2022, 2 pgs.

Roozbeh et al., "Software-Defined "Hardware" Infrastructures: A Survey on Enabling Technologies and Open Research Directions", 2018, 34 pgs., <https://doi.org/10.1109/COMST.2018.2834731>.

Samragh et al., "CodeX: Bit-Flexible Encoding for Streaming-based FPGA Acceleration of DNNs", Jan. 17, 2019, 9 pages.

Shantharama et al;, "Hardware Acceleration for Container Migration on Resource-Constrained Platforms", IEEE Access, Sep. 18, 2020, vol. 8, 2020, 16 Pgs, <https://creativecommons.org/licenses/by4.0/>.

Sze et al., "Efficient Processing of Deep Neural Networks: A Tutorial and Survey", Aug. 13, 2017, 32 pages.

Unknown, "Understanding disaggregated compute and storage for Kubernetes," Oct. 5, 2020, 9 pgs., <https://portworx.com/understanding-disaggregated-compute-and-storage-for-kubernetes/>.

Weerasinghe, J. "Standalone Disaggregated Reconfigurable Computing Platforms in Cloud Data Centers", https://mediatum.ub.tum.de/doc/1382836/1382836.pdf, Technische Universität Munchen, May 2018, 182 pgs.

Xu et al., "Scaling for edge inference of deep neural networks", nature electronics, Apr. 2018, 8 pages.

Zhang et al., "HGum: Messaging Framework for Hardware Accelerators", Jan. 19, 2018, 8 pages.

Github, "AWS Shell Interface Specification," https://github.com/aws/aws-fpga/blob/master/hdk/docs/AWS_Shell_Interface_Specification.md#ShellInterfaces, printed May 7, 2020, 21 pgs.

Github, "IBM CAPI SNAP framework, Version 1.0, How is data managed in the SNAP environment?," https://github.com/openpower/snap/blob/master/doc/AN_CAPI_SNAP-How_is_data_managed.pdf, printed May 7, 2020, 3 pgs.

Mell et al., "The NIST Definition of Cloud Computing," Recommendations of the National Institute of Standards and Technology, U.S. Department of Commerce, Special Publication 800-145, Sep. 2011, 7 pgs.

Putnam, et al., "A Reconfigurable Fabric for Accelerating Large-Scale Datacenter Services," https://www.microsoft.com/en-US/research/wp-content/uploads/2016/02/Catapult_ISCA_2014.pdf, © 2014 IEEE, 12 pgs.

Ringlein et al., "System architecture for network-attached FPGAs in the Cloud using partial reconfiguration," IEEE: DOI 10.1109/FPL.2019.00054, © 2019 IEEE, 8 pgs.

Tarafdar et al., "Building the Infrastructure for Deploying FPGAs in the Cloud," https://www.researchgate.net/publication/327162335, Jan. 2019, 27 pgs.

Unknown, "Express routing," https://expressjs.com/en/guide/routing.html, printed May 7, 2020, 6 pgs.

Xilinix, "Data Center Acceleration," https://www.xilinx.com/applications/data-center.html, printed May 7, 2020, 6 pgs.

\* cited by examiner

FIG. 6 request.path table 700

| path (string) | request_type (integer) |
|---|---|
| GET/public_key | 0x42 |
| POST/encrypted_message | 0x43 | request.type table 702

| request_type (integer) | instructions (binary) |
|---|---|
| 0x42 | op_call_smc 1 42<br>op_smc_to_buffer<br>op_handle_http<br>op_buffer_to_tcp |
| 0x43 | op_handle_http<br>op_tcp_to_buffer<br>op_buffer_to_smc<br>onComplete:<br>    op_call_smc 2 43 |

CONFIGURATION OF HARDWARE DEVICES

BACKGROUND

The present invention relates generally to reconfigurable hardware devices, and more specifically for configuring a reconfigurable hardware device to execute a user application. Methods for configuring such devices are provided, together with device architectures used in these methods.

Reconfigurable hardware devices, such as FPGAs (Field-Programmable Gate Arrays), comprise integrated arrays of logic blocks and configurable interconnects which can be configured by programming to implement desired functionality. Such devices offer flexible, high-speed processing resources and are increasingly used in cloud computing environments to allow dynamic deployment of user applications in the cloud. For operation in these environments, FPGAs typically employ some type of "shell/role" architecture (SRA). The "shell" implements basic functionality, such as network routing and I/O (input/output) connections for network and memory, required by the user applications to be deployed on the FPGA. This static logic provides a trusted platform, controlled by the cloud vendor/supplier, for supporting user applications and enforcing privilege separation between trusted and untrusted logic. The "role" corresponds to the application-specific logic which implements the (potentially untrusted) user application. A boot image for the shell configuration is typically held in storage (e.g., flash memory) next to the FPGA for programming to the FPGA at boot time. The role can then be dynamically configured (e.g., at runtime) for executing a particular user application.

SUMMARY

According to one aspect of the present disclosure there is provided a method for configuring a reconfigurable hardware device to execute a user application. The method includes providing static shell logic on the reconfigurable hardware device. The static shell logic is controlled by a primary management core for managing operation of the reconfigurable hardware device, and has a predetermined hardware interface. The method also includes configuring on the reconfigurable hardware device, via the primary management core, dynamic shell logic for implementing dynamically-selected shell functionality. The dynamic shell logic includes a secondary management core, adapted to communicate with the primary management core via the hardware interface, for managing operation of the dynamic shell logic. The method further comprises configuring on the reconfigurable hardware device, via the primary management core, application logic, having an interface with the dynamic shell logic, for executing the user application. In this method, the secondary management core uploads to the primary management core dynamic code to adapt the primary management core for use with the dynamic shell logic.

A further aspect of the present disclosure provides a computing apparatus for executing a user application. The computing apparatus comprises a reconfigurable hardware device and a primary management core for managing operation of the reconfigurable hardware device, the reconfigurable hardware device being configured by a configuration method described above. An additional aspect of the present disclosure provides a computer program product comprising a computer readable storage medium embodying program instructions, executable by a computing apparatus, to cause the computing apparatus to configure a reconfigurable hardware device of the computing apparatus by a configuration method described above.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Embodiments of the present disclosure will now be described, by way of example only, with reference to the following drawings, in which.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
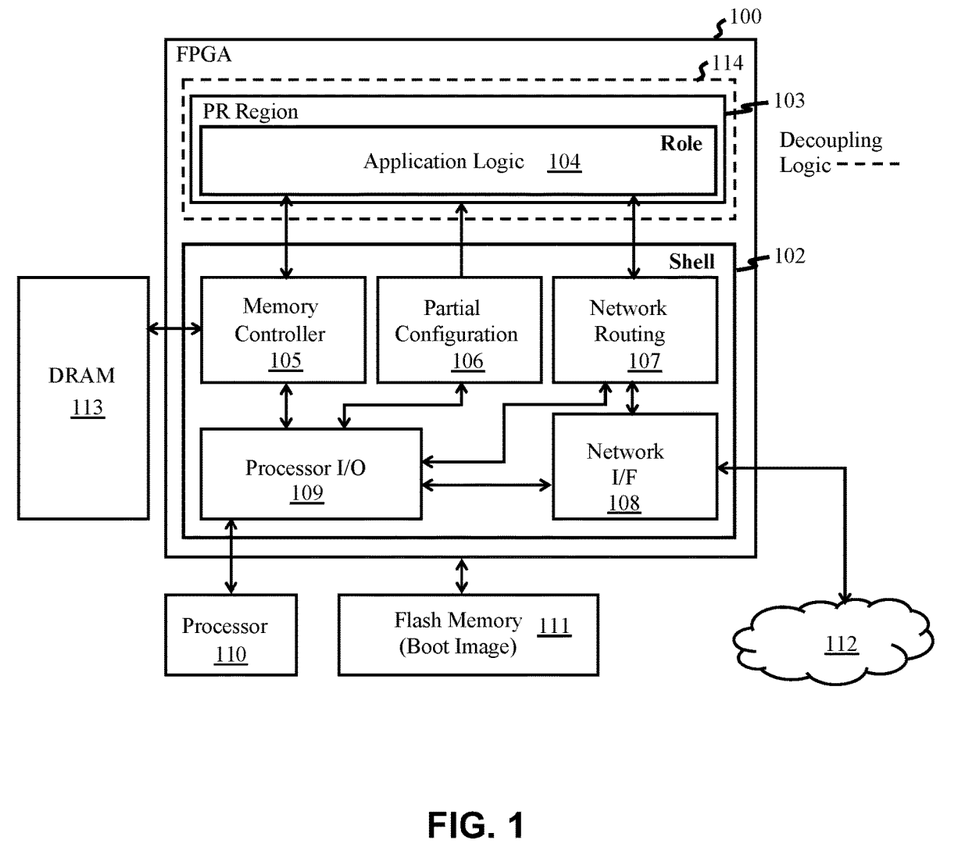
FIG. 1 illustrates a schematic representation of a shell/role architecture of an FPGA, in accordance with embodiments of the present disclosure.

Referring now to FIG. 1, shown is an exemplary shell/role architecture for an FPGA 100, in accordance with embodiments of the presence disclosure. The FPGA 100 has a shell region 102 configured with static logic, and a partial-reconfiguration (PR) region 103 which is configured with application logic 104 for executing a specific user application (role). The shell 102 comprises blocks of logic implementing basic functionality for roles. Shell 102 is shown here comprising a memory controller core 105, a PR core 106, a network routing core (NRC) 107, network interface logic 108, and processor I/O 109. The I/O logic 109 provides functionality for communication between FPGA 100 and a processor 110 which controls FPGA operation, including power up/down, establishing network connection on power-up, and general monitoring and system management functions. A flash memory 111 connected to FPGA 100 stores a boot image (shell configuration bitstream) for the shell 102. The shell 102 is configured at boot time by loading this boot image to FPGA 100, either automatically or under control of processor 110.

Network I/F logic 108 provides the interface(s) and network protocol engines for connecting FPGA 100 to a network 112. In general, network 112 may comprise one or more component networks and/or internetworks, including the Internet. For example, FPGA 100 may be connected to a datacenter LAN which is accessible to users via the Internet, allowing deployment of user applications in a cloud computing environment in which cloud vendors/suppliers offer IaaS (Infrastructure as a Service) and/or HPC (High Performance Computing) as a service. In embodiments, network 112 may be substantially similar to, or the same as, cloud computing environment 850 described in FIG. 8. PR core 106 allows dynamic configuration of application logic 104 in PR region 103 in accordance with images (PR bitstreams) for roles. Roles may be configured/reconfigured dynamically (e.g., at runtime) in response to images loaded from network 112 and/or processor 110. Memory controller core 105 controls data transfer between application logic 104 and memory, here DRAM 113, next to FPGA 100 during operation of the user application. NRC 107 provides network routing functionality for traffic to and from application logic 104 based on routing tables maintained in this core.

Shell 102 provides a trusted vendor-provided platform for supporting user applications deployed on the FPGA 100. The architecture allows privilege separation to be enforced between the shell and (untrusted) user applications. During partial reconfiguration of applications, decoupling logic (indicated schematically by dashed box 114 in the figure) is configured to decouple application logic (role) 104 from the shell logic, protecting the shell from undefined signal behavior.

FPGA 100 may be deployed as a standalone resource, independent of a host server, connected directly to a datacenter network, with processor 110 provided on the same die as FPGA 100 in a system-on-chip design. In other implementations, the FPGA 100 may serve as a coprocessor/accelerator for a host server, in which case I/O logic 109 provides the interface to a host CPU/processor 110.

The above architecture allows dynamic deployment of user applications on top of trusted shell logic which abstracts the physical I/O to the user. However, functionality available to users is limited by static shell functionality and the interface between the shell and role. Shells need to be published as netlists to allow generation of PR bitstreams, and any new feature or bug-fix requires a new shell type. Frequent reconfiguration of the shell slows down system operation and results in loss of internal state. Only limited storage may be available for boot images, especially for standalone, network-attached devices where the FPGA flash memory may store just a single image. Frequent power-off/on switching of the device also compromises power efficiency.

Figure 2:
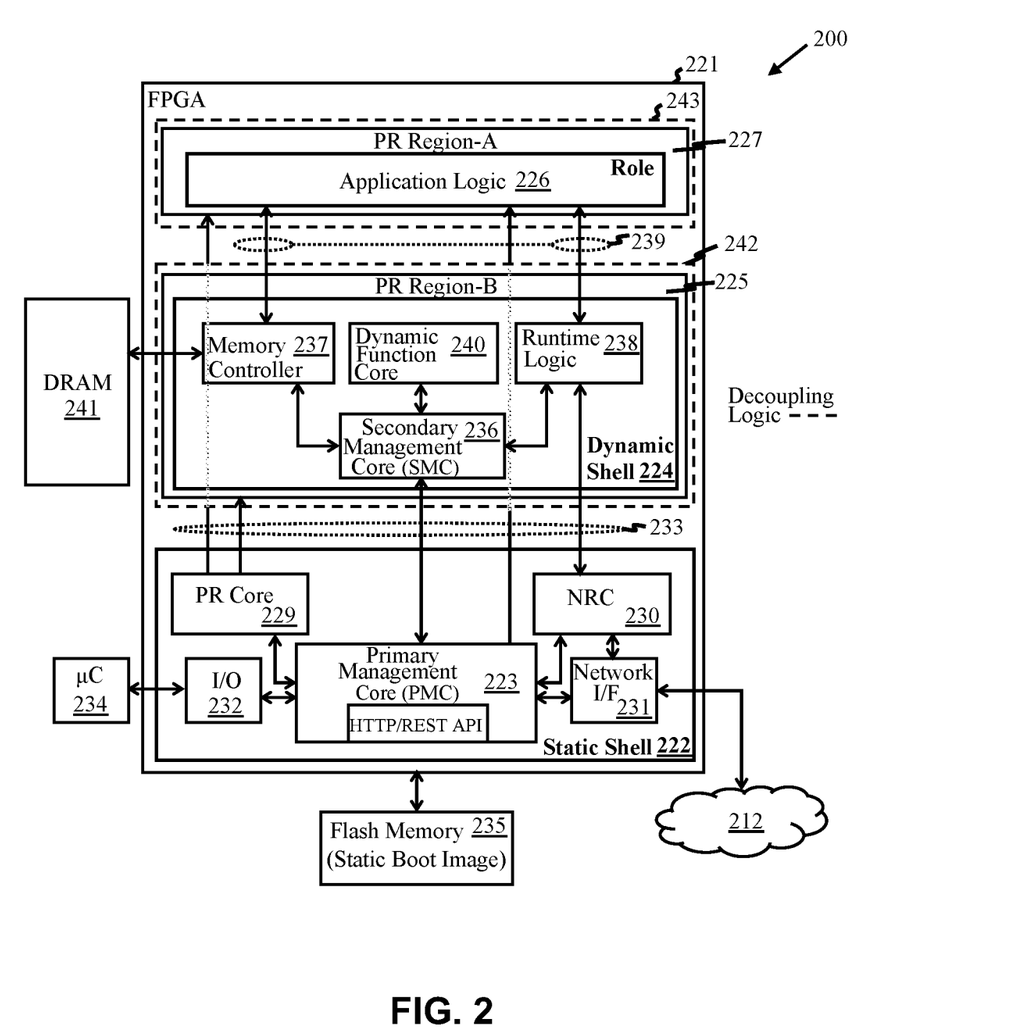
FIG. 2 illustrates a schematic representation of a computing apparatus, in accordance with embodiments of the present disclosure.

Referring now to FIG. 2, shown is an example architecture of computing apparatus 200, in accordance with embodiments of the present disclosure. The computing apparatus 200 comprises a reconfigurable hardware device and a primary management core for managing operation of the device. In the illustrated embodiment, the reconfigurable hardware device comprises an FPGA 221, and the primary management core is configured in shell logic of the FPGA. In particular, FPGA 221 includes static shell logic which is configured in static shell 222 of the FPGA. The primary management core (PMC) 223 is provided in static shell 222.

FPGA 221 further comprises dynamic shell 224 which is configured in a PR region-B 225, and application logic 226 which is configured in a PR region-A 227. Both dynamic shell 224 and application logic (role) 226 are configured dynamically in operation as described below.

The static shell logic is controlled by PMC 223 which manages overall operation of FPGA 221 and processing of requests from network 212. As well as PMC 223, static shell 222 includes logic implementing basic functionality required by all applications to be deployed on the FPGA. In this embodiment, the static shell 222 includes a PR core 229, a network routing core (NRC) 230, network interface (I/F) logic 231, and input/output (I/O) logic 232. The PMC 223 controls operation of all static shell cores and configures any necessary setup/operational parameters in these cores. The PMC 223 includes an appropriate API (Application Programming Interface) for supporting function calls from network 212 and I/O logic 232. In this embodiment, the PMC 223 includes an HTTP/REST (Hypertext Transfer Protocol/Representational State Transfer) API for supporting REST API calls from a datacenter network. The static shell 222 is configured with a static hardware interface, indicated generally at 233 in the figure, for communication with dynamically-configured FPGA logic. Static hardware interface 233 thus provides a predetermined, static interface for all subsequently-configured logic.

Network I/F logic 231 comprises the interface(s) and protocol engines for connecting FPGA 221 to a network 212 as described above. Functionality of IF logic 231 depends on configuration of network 212, but typical I/F logic may comprise an Ethernet core for accessing a datacenter LAN, with additional protocol engines for implementing the transport and network layers. In an exemplary implementation, these engines may comprise TCP (Transport Control Protocol), UDP (User Datagram Protocol), ICMP (Internet Control Message Protocol) and IPv4 (Internet Protocol Version 4) engines. PR core 229 implements the partial reconfiguration of logic in PR region-A 227 and PR region-B 225 under control of PMC 223. This PR core may be implemented, for example, by a proprietary HWICAP (Hardware Internal Configuration Access Port) core. The NRC 230 stores the routing tables and implements routing functionality for traffic between the network 212 and application 226, and between the network and PMC 223. I/O logic 232 provides an interface to a microcontroller (μC) 234 which can be provided on the same card as FPGA 221 in this embodiment. The microcontroller 234 controls power on/off and basic network setup (e.g., IP address programming) for the FPGA. The static boot bitstream for configuring static shell 222 is loaded from flash module 235 at boot time, either automatically or under control of microcontroller 234.

Dynamic shell 224 comprises logic implementing shell functionality which is selected dynamically as described below. The dynamic shell 224 includes a secondary management core (SMC) 236 for managing operation of the dynamic shell logic. The SMC 236 is adapted to communicate with the PMC 223 in static shell 222 via the static hardware interface 233. In this embodiment, the dynamic shell 224 also comprises a memory controller 237 and run-time logic 238, both of which interface with application logic 226 via a dynamically-configured role interface indicated schematically at 239. Dynamic shell 224 may further include one or more dynamic function cores 240 for implementing additional functionality required by application logic 226. Examples of such functionality include encryption/decryption, application-specific preprocessing (e.g., image preprocessing such as image normalization for an object-detection application), filter algorithms, compression, decompression, etc.

Memory controller 237 controls data transfer between application logic 226 and the FPGA memory, here DRAM 241, during execution of the user application. In particular, memory controller 237 converts between the memory access protocols used by application logic 226 and DRAM 241, providing the appropriate memory ports to application logic 226 via dynamically-configured role interface 239. Runtime logic 238 provides a runtime communications interface between application logic 226 and NRC 230 in static shell 222 for supporting communications between the application and network 212 according to the particular application requirements. This logic may comprise, for example, an MPI (Message Passing Interface) protocol implementation, an Open CL (Open Computing Language) wrapper, an HTTP frontend, etc., as required by a given application. The SMC 236 controls operation of all dynamic shell cores and configures any necessary setup/operational parameters in these cores.

During operation of FPGA 221, the PMC 223 and SMC 236 can communicate over static hardware interface 233 using a standard communications protocol, e.g., an AXI (Advanced eXtensible Interface) protocol such as AXI4-Lite. In this embodiment, PMC 223 also has a connection to application logic 226 via static hardware interface 233 to control basic functionality such as start/reset operations and configuration of node IDs for network operation.

The embodiment of FIG. 2 allows operation of FPGA 221 as a standalone computing apparatus, independent of a host server, with PMC 223 providing the functionality for handling network calls/requests via its internal API. The FPGA 221 may be one device of a bank, or multiple banks, of FPGAs connected to a datacenter network, providing a disaggregated heterogeneous computing infrastructure which can be dynamically scaled to requirements of a given workload. In such an infrastructure, microcontroller 34 may be connected to a hierarchy of management processors providing control at different hierarchy levels of the overall FPGA infrastructure.

Various other cores may be included in the architecture of FIG. 2. For example, the static shell 222 and/or dynamic shell 224 may include logic implementing other communication protocols, as well as diagnostic, status monitoring, debugging and clocking functions, etc. In some dynamic shell configurations, dynamic function cores 240 and/or runtime logic 238 may be omitted. In some embodiments, DHCP (Dynamic Host Configuration Protocol) may be used to assign network configuration parameters (e.g., IP address) to the FPGA 221 in which case microcontroller 234 may be omitted. The connection between PMC 223 and application logic 226 may also be replaced by a connection between SMC 236 and the application logic over dynamically-configured role interface 239.

Figure 3:
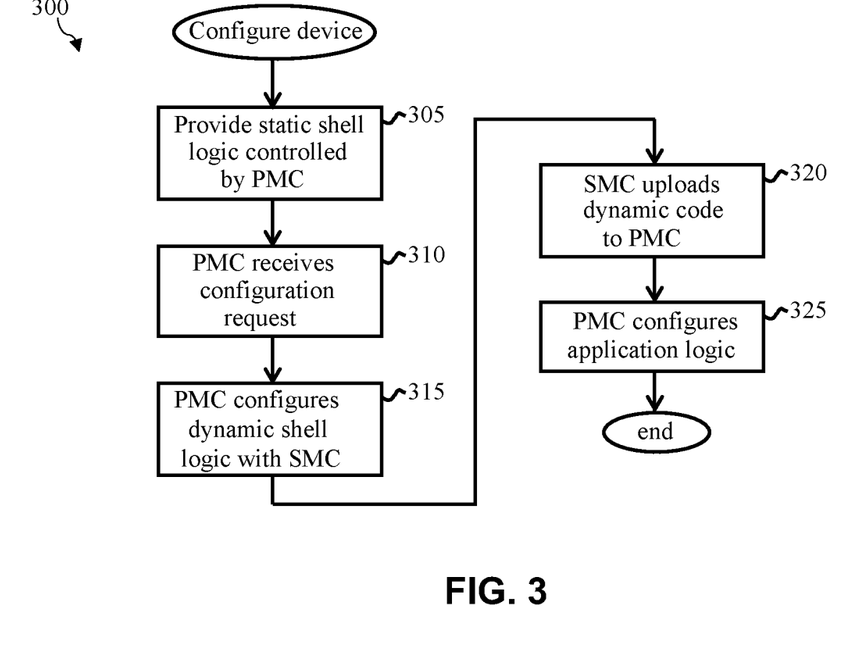
FIG. 3 illustrates a flow diagram of an example method for configuring the computing apparatus of FIG. 2, in accordance with embodiments of the present disclosure.

Referring now to FIG. 3, shown are steps of a configuration method 300 for configuring the computing apparatus 200 of FIG. 2 to execute a user application, in accordance with embodiments of the present disclosure. The static shell logic, controlled by PMC 223, is provided on the FPGA 221 as indicated at step 305. The static shell logic may be preconfigured in some embodiments, or may be configured here by loading the static image from flash module 235 at boot time.

The role is defined by a user who generates a design for the application logic 226. This may be specified in a hardware description language (HDL) such as VHDL, Verilog, etc., or may be defined by code such as OpenCL (Open Computing Language) which is interpreted by High-level Synthesis (HLS) tools to generate an RTL (Register Transfer Level) design. The designs can be synthesized to gate level using standard synthesis tools which generate the bitstreams for programming the FPGA logic. The user can also dynamically select an appropriate dynamic shell 224 providing the specific shell functionality required by the application. The dynamic shells can be defined by the cloud vendor/supplier and may be presented as a library of dynamic shell designs for supporting requirements of different user applications. The dynamic shells can be defined in various ways as described for role designs.

In step 310 of method 300, the PMC 223 receives a configuration request, here from network 212, with the configuration bitstreams for the selected dynamic shell and role. In step 315, the PMC 223 controls configuration of logic for implementing the dynamically-selected shell functionality, writing the dynamic shell bitstream to PR core 229 to trigger configuration of dynamic shell 224. At step 320, the PMC 223 configures decoupling logic (indicated schematically at 242 in FIG. 2) to decouple the dynamic shell from the static shell and thus avoid side effects of the partial reconfiguration. Such decoupling logic can be implemented by simple multiplexers which are configured to block all undefined signals on static interface 233 during partial reconfiguration.

In step 320, the SMC 236 uploads to PMC 223 dynamic code to adapt the PMC for use with the dynamic shell logic. As described in more detail below, this upload can be performed in response to a request from PMC 223 via its communication interface with SMC 236, whereupon the dynamic code is transferred over hardware interface 233. In step 325, the PMC 223 controls configuration of the application logic 226 and interface 239 with dynamic shell 224, writing the role bitstream to PR core 229. During this PR process, the PMC 223 configures decoupling logic 243 to decouple the application logic from the shell logic. Both dynamic shell 222 and application logic (role) 226 are thus configured dynamically via the PMC. The FPGA 221 is then fully configured for operation, and the role can be executed on the FPGA.

The configuration method and architecture described above allow the shell functionality to be dynamically extended with new/alternative functionality as required, e.g., to provide functionality required by different user applications. Dynamically-selected shell functionality can be deployed over network 212, while allowing the vendor/supplier to maintain control of the shell and enforce privilege separation between static and dynamically-configured logic. A static hardware interface is provided for the static shell logic, while the dynamic shell/role interface can be configured dynamically as required. These features offer flexibility in shell logic, without requiring local storage of multiple shell images in FPGA flash and rebooting to reconfigure static shell hardware. The flexible nature of FPGA technology can be fully exploited, and supplier-controlled functionality can be quickly and easily adapted during operation to provide a comprehensive platform for application deployment.

The dynamic code uploaded by SMC 236 can be used to adapt the PMC 223 as required for use with any dynamic shell logic 237, 238, 240, even if such a core is not known when the static shell is created. Dynamic code may include runtime configurations/settings of dynamic shell cores as well as code for extending the PMC API to handle new function calls relating to operation of these cores. The operation of PMC 223 and SMC 236 during configuration and execution of a user application will be described for exemplary embodiments below.

Figure 4:
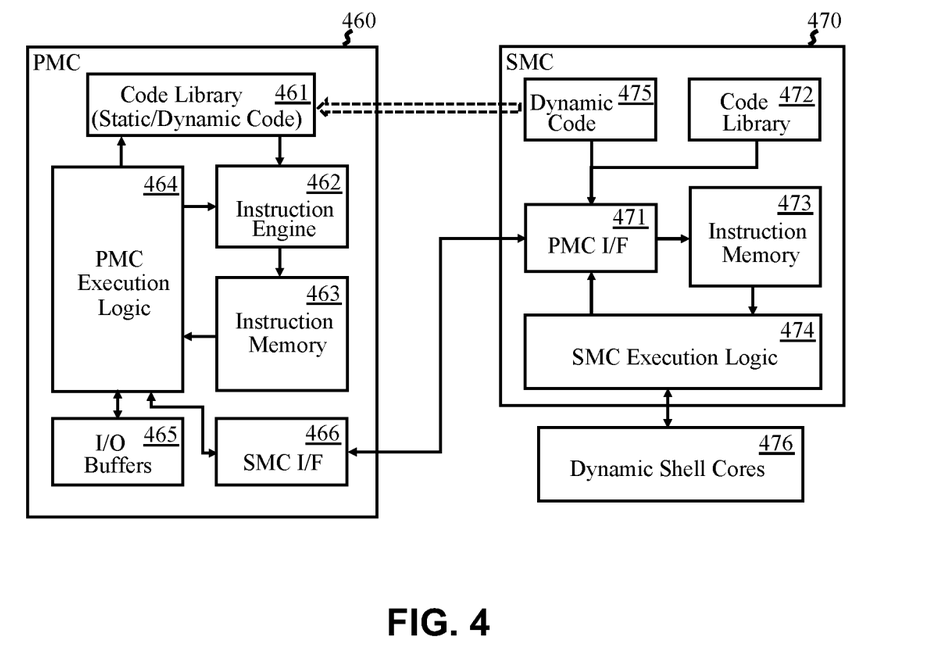
FIG. 4 illustrates the architecture of primary and secondary management cores in the computing apparatus of FIG. 2, in accordance with embodiments of the present disclosure.

Referring now to FIG. 4, shown is a schematic representation of PMC 460 and SMC 470 architecture, in accordance with embodiments of the present disclosure. The PMC 460 of the illustrated embodiment comprises a code library 461, an instruction engine 462, an instruction memory 463, execution logic 464, I/O buffers 465 for I/O to static shell cores, and the communication interface 466 for interfacing with SMC 470. SMC 470 comprises communication interface 471 for PMC 460, a (static) code library 472, instruction memory 473, and SMC execution logic 474. The SMC 470 also has an address space 475 storing the dynamic code for upload to PMC 460 as described below. The SMC 470 is connected to the dynamic shell cores, indicated generally at 476, such as IP cores 237, 238 and 240 in FIG. 2.

Code library 461 of PMC 460 stores the static code for general PMC operation and control of static shell cores, and receives the dynamic code from SMC 470 as described below. Instruction engine 462 comprises a microcode engine which generates instructions for execution by the PMC 460 based on code in library 461. Instructions are loaded to instruction memory 463 and supplied to execution logic 464 for execution. The execution logic 464 implements the PMC ISA (Instruction Set Architecture) execution loop based on static/volatile state information, updating the static/persistent state accordingly. Instructions may use configuration/input data which is received via I/O buffers 465 (including network I/O) and/or SMC IF 466 and which is supplied to instruction engine 462 for instruction generation. Similarly, execution of instructions may result in output of data/commands to I/O buffers 465 and/or SMC I/F 466 which forwards commands and data to SMC 470.

In SMC 470, PMC I/F 471 receives commands from PMC 460 and loads instructions to SMC instruction memory 473 from SMC code library 472. SMC execution logic 474 executes instructions loaded from instruction memory 473, interacting with dynamic shell cores 476 as required. The resulting data is supplied to PMC I/F 471 for return to PMC 460.

Figure 5:
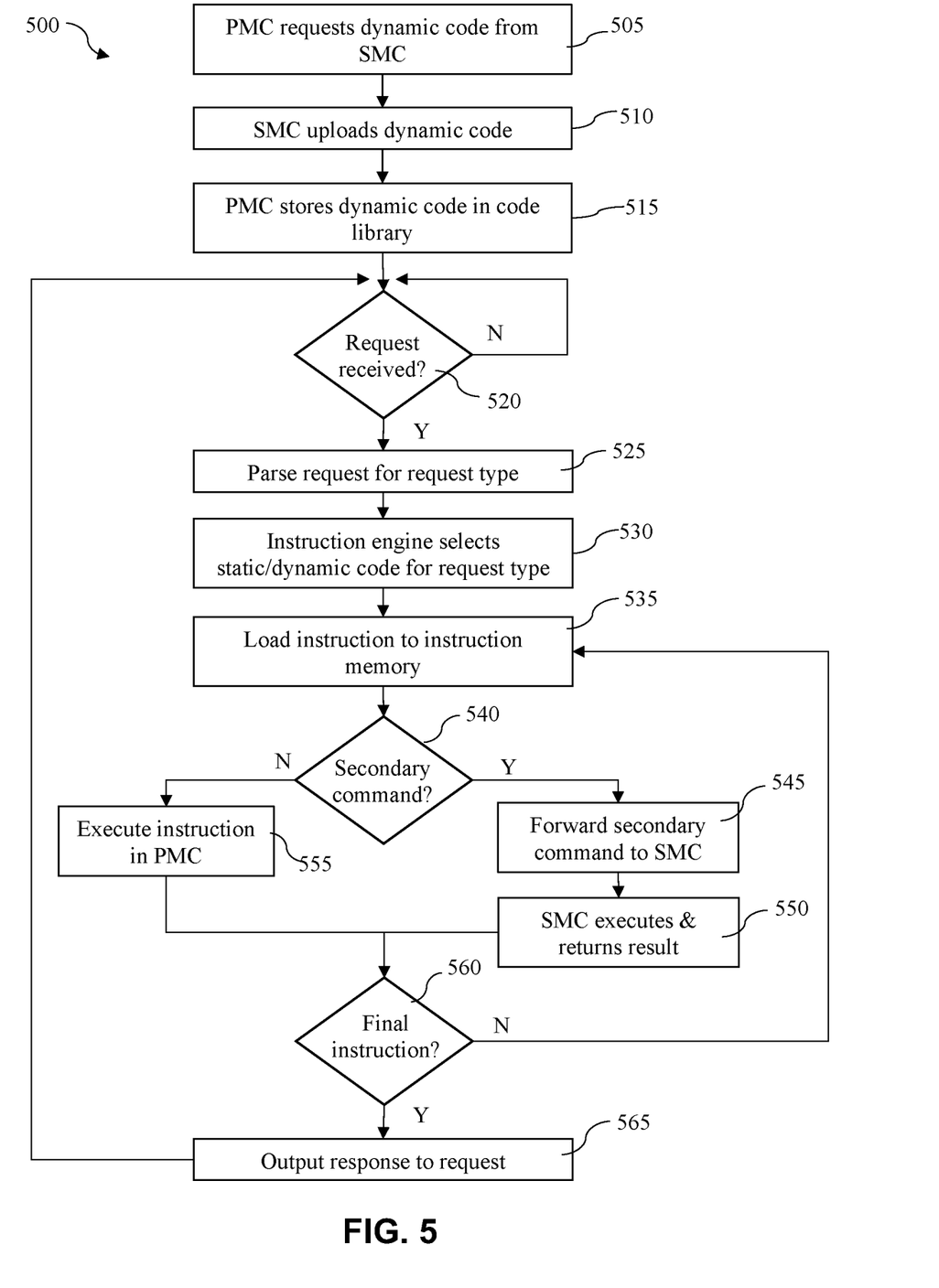
FIG. 5 illustrates a flow diagram of an example method implemented by the primary and secondary management core architecture of FIG. 4, in accordance with embodiments of the present disclosure.

Referring now to FIG. 5, shown is a flow diagram of an example method 500 implemented by the primary and secondary management core architecture of FIG. 4, in accordance with embodiments of the present disclosure. In step 505, PMC 460 requests upload of dynamic code from SMC 470. This is implemented via execution of instructions from the static code in code library 461, resulting in forwarding of an upload command to SMC 470 via interface 466 (e.g., op_load_code <offset><length>). In step 510, PMC I/F 471 responds by retrieving the dynamic code from address space 475 and forwarding this code to PMC 460. Further static code instructions in PMC 460 cause execution logic 464 to store the received code in PMC code library 461 in step 515.

The uploaded dynamic code adapts PMC 460 for use with the cores 476 in dynamic shell 224 during execution of the user application. Instruction engine 462 can use the dynamic code to generate instructions enabling the PMC to process input requests relating to dynamic shell functionality, forward the necessary commands to SMC 470, and generate appropriate responses to requests following execution of commands in SMC 470 and/or internally in the PMC. Instructions can thus be executed in both the PMC and the SMC/dynamic shell cores. In particular, instructions generated from the dynamic code can include primary commands, for execution by the primary management core, and secondary commands for execution by the secondary management core using the dynamic shell logic. In executing these instructions, the PMC forwards secondary commands to the SMC, via SMC I/F 466, over hardware interface 233. The PMC API can thus be extended to accommodate new function calls not known on creation of the static shell. Static/dynamic code for generating instructions can be selected in dependence on content of an input request, e.g., a predetermined field indicating the request type, as described below.

Steps 520 to 565 of FIG. 5 represent operation of PMC 460 during execution of the user application. When an input API request/call (e.g., from network 212) is received at step 520, the PMC parses the request in step 525 to identify the request type. The resulting request type determines whether static or dynamic code is selected for handling the request, and which particular code is selected. Instruction engine 462 selects the appropriate code in step 530, and it generates instructions for handling the request. Each instruction is loaded to instruction memory 463 in step 535. If an instruction comprises a secondary command (as represented by a "Yes" (Y) at decision block 540), execution logic 464 will, in executing the instruction, forward the secondary command to SMC 470 in step 545. In step 550, the SMC 470 executes the command and returns the result to PMC 460 for further processing. Primary command instructions, containing no secondary commands ("No" (N) at decision block 540), are executed by PMC logic in step 555 in the usual way. The PMC instruction loop continues to the next instruction, as represented by decision step 560, until the final instruction outputs the response to the request (e.g., to network 212) at step 565. Method 500 then reverts to step 520 and the PMC awaits the next request.

PMC operation is further illustrated below for a particular example in which the dynamic shell includes an encryption core for encryption/decryption of messages sent between application logic 226 and network 212. In particular, messages sent to the application from the network are encrypted under the application's public encryption key which is supplied to network devices on demand. Encrypted messages received from the network must be posted to the encryption core in dynamic shell 224 for decryption. To cope with this, the PMC API must be extended to accommodate two new function calls: GET/public_key and POST/encrypted_message. An implementation of the PMC architecture and dynamic code structure for achieving this is illustrated in FIG. 6 and FIG. 7.

Figure 6:
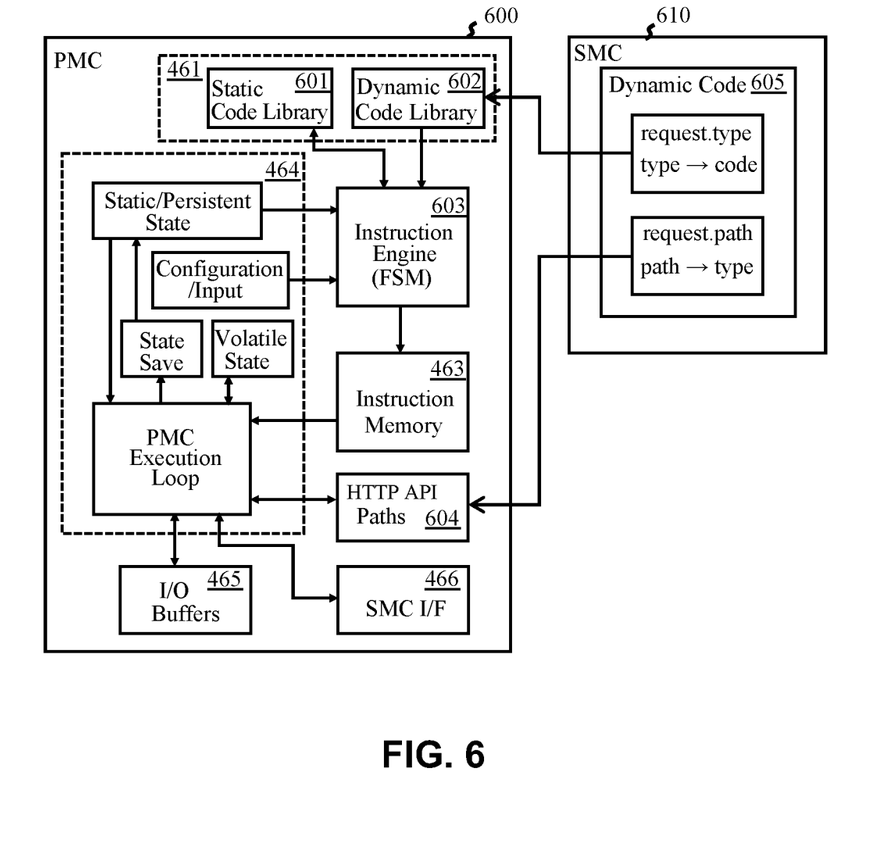
FIG. 6 illustrates architectural details of a primary management core, in accordance with embodiments of the present disclosure.

Referring now to FIG. 6, shown is PMC 600 of an embodiment in more detail, with components corresponding to those of FIG. 4 being denoted by like reference numerals. PMC 600 includes a static code library 601 and a dynamic code library 602. Instruction engine 603 is implemented as an FSM (Finite State Machine). The PMC 600 includes a path table 604 storing the HTTP API paths for handling input requests from network 212. The dynamic code 605 in SMC 610 of this embodiment comprises two tables. A "request.path" table maps the path (or URL (Uniform Resource Locator)) of an PMC API input request to a (new) request type. A "request.type" table maps request types specified in the path table to dynamic code. On uploading of the dynamic code to PMC 600, the dynamic request.path table is added to PMC path table 604, and the request.type table is stored in dynamic code library 602.

Figure 7:
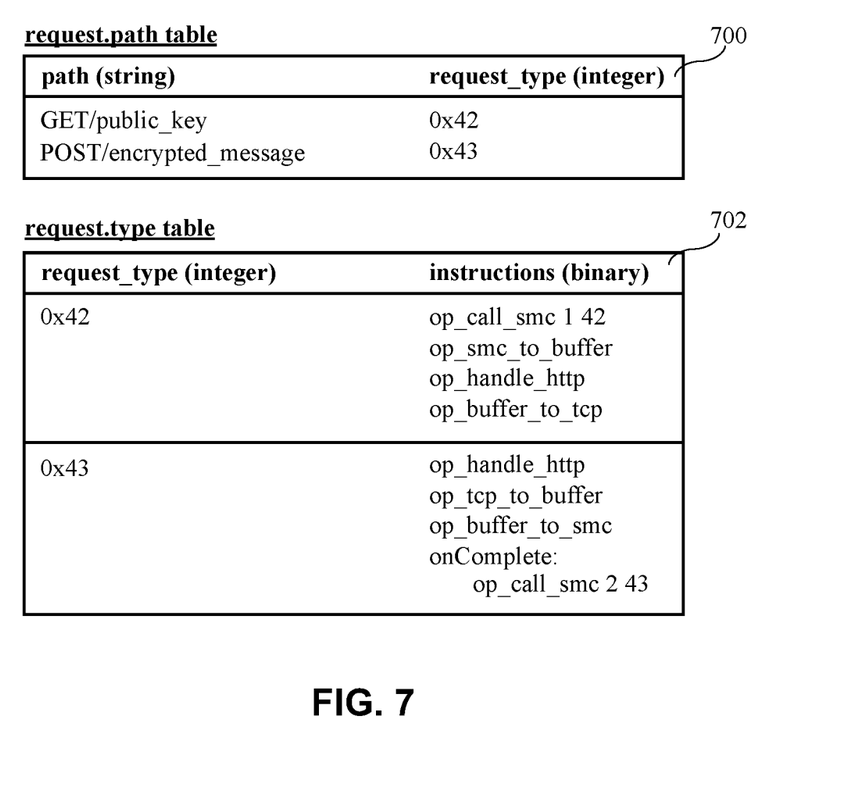
FIG. 7 illustrates table entries for dynamic code uploaded to the management core of FIG. 6 in an exemplary implementation, in accordance with embodiments of the present disclosure.

Referring now to FIG. 7, shown are table entries for dynamic code uploaded to the management core of FIG. 6, in accordance with embodiments of the present disclosure. The request.path table 700 contains two entries for the new GET/public_key and POST/encrypted_message paths. The request.type table 702 contains the corresponding dynamic code. Now, when the PMC 600 receives a request with the path GET/public_key, it will identify this as a valid path in path table 604. The corresponding request type will be supplied to instruction engine 603 to load the appropriate code from dynamic code library 602. In executing this code, the PMC 600 makes an op call (op_call_smc<functionNumber><argument>) forwarding the secondary command (<1> <42>) to the SMC 610 via SMC I/F 466. The subsequent primary commands retrieve the public key from the PMC input buffer, generate the HTTP response containing the public key, and output the response to network I/F 231. Similarly, on receiving an HTTP request with the path POST/encrypted_message, the corresponding dynamic code will be identified in dynamic code library 602. The primary commands in this code cause PMC 600 to process the HTTP request, retrieve the encrypted message from network interface 231, and buffer the message for forwarding to the SMC 610. The final op_call forwards the secondary command (<2> <43>) to the SMC 610 for decryption of the message by the encryption core in the dynamic shell.

When the dynamic shell is reconfigured for a new application, the dynamic code will be deleted from PMC 600, allowing new functionality to be implemented via new dynamic code. The system thus allows static shell functionality to be dynamically extended with required new functionality at runtime, without downtime and reloading of static shell cores.

It will be appreciated that many changes and modifications can be made to the exemplary embodiments described. In alternative embodiments, for example, functionality of PMC 223, 460, 600 may be provided by a processor operatively coupled to the FPGA 221. A dedicated microprocessor implementing this functionality may be integrated with FPGA 221, on the same die, in a system-on-chip design. I/O logic in the static shell 222 then incorporates the SMC interface 466.

While preferred embodiments implementing a stand-alone, network connected FPGA are described above, in other embodiments the FPGA may be implemented as a coprocessor coupled to a host CPU. Also, while FPGAs are particularly described above, embodiments may be implemented with any other type of reconfigurable hardware device based on reconfigurable logic arrays.

In general, where features are described herein with reference to a method embodying the present disclosure, corresponding features may be provided in a computing apparatus/computer program product embodying the present disclosure, and vice versa.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
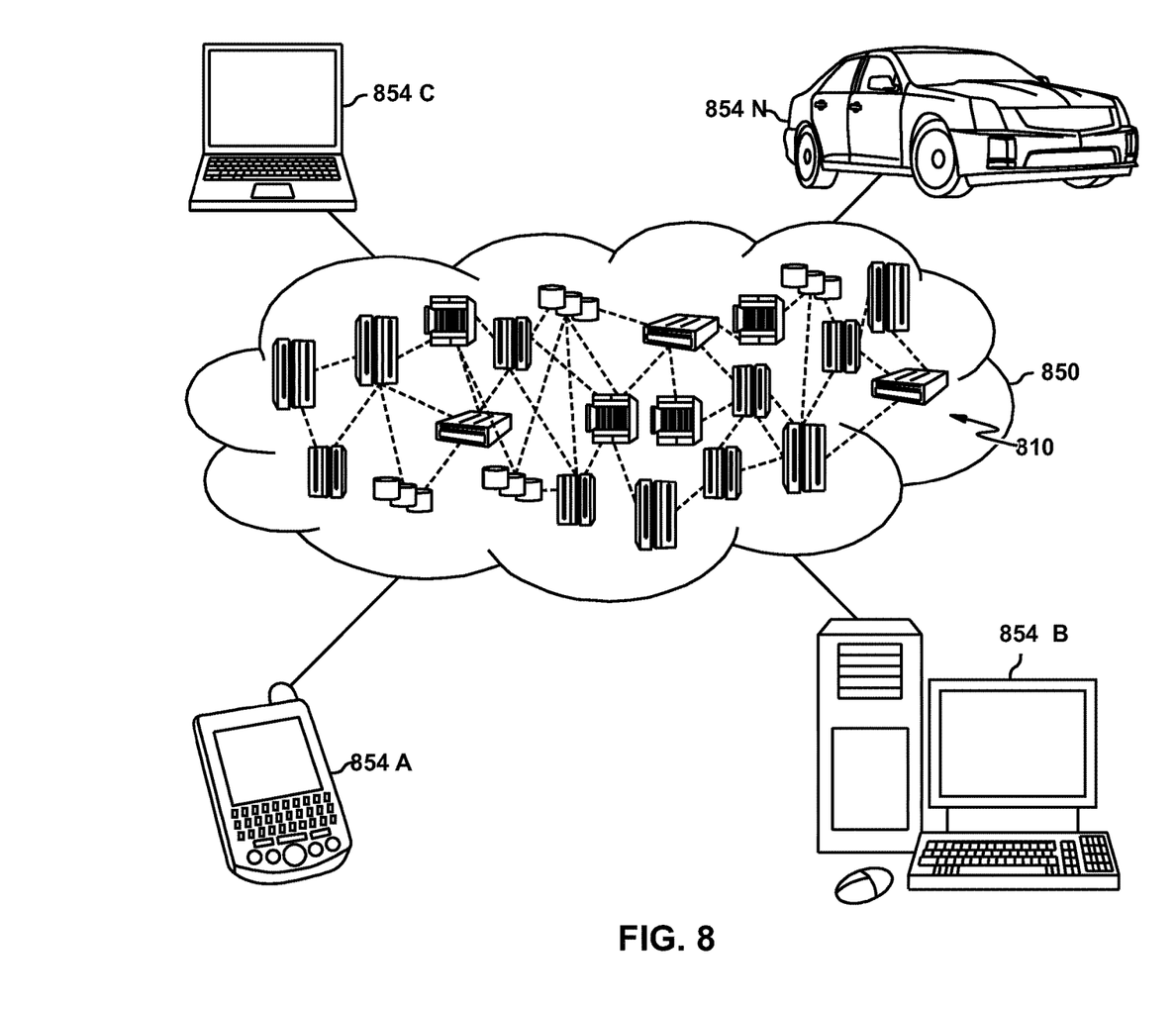
FIG. 8 depicts a cloud computing environment in accordance with embodiments of the present disclosure.

Referring now to FIG. 8, illustrative cloud computing environment 850 is depicted. As shown, cloud computing environment 850 comprises one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private. Community. Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
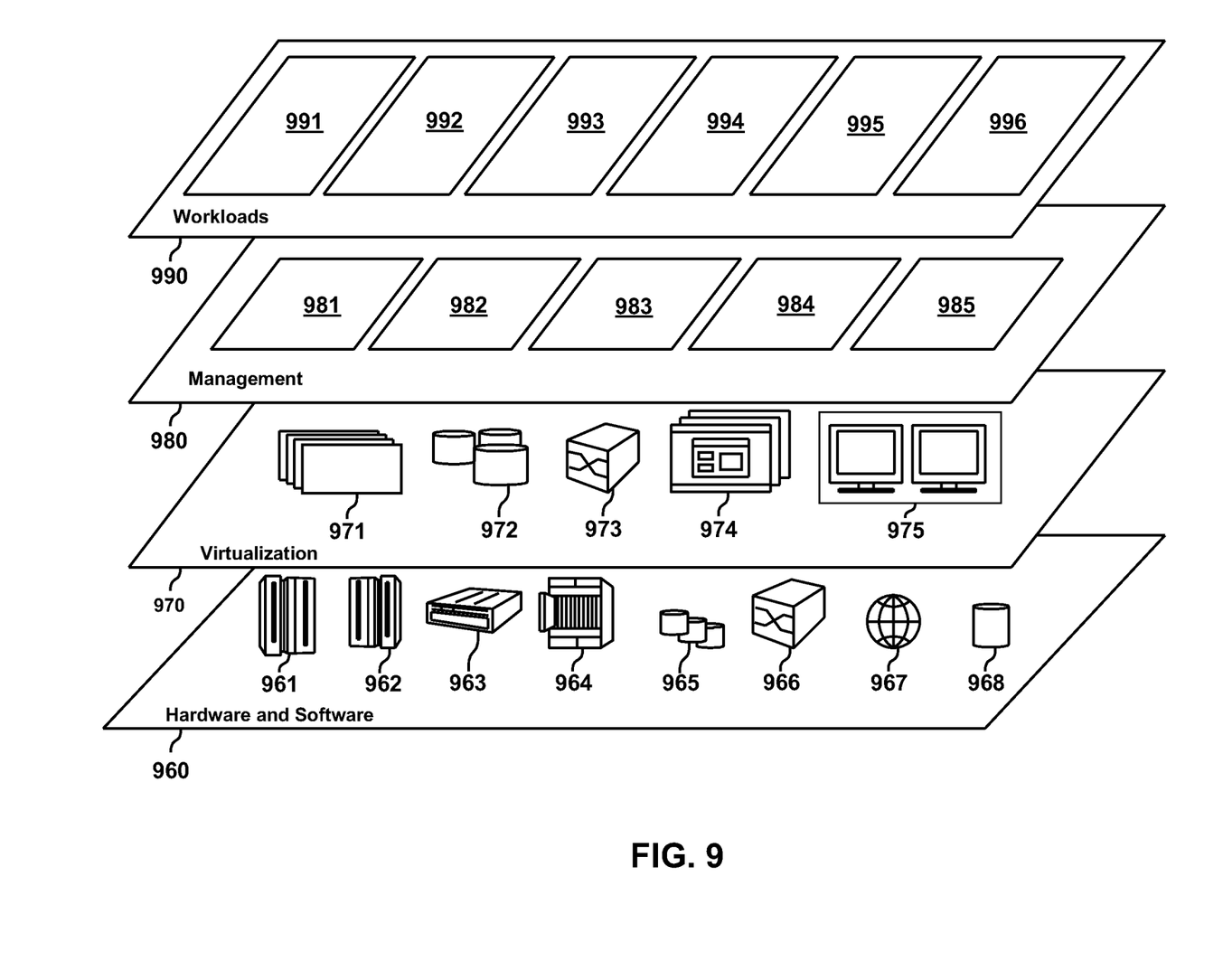
FIG. 9 depicts abstraction model layers in accordance with embodiments of the present disclosure.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and FPGA software 968 in relation to the FPGA 100 of FIG. 1.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and mobile desktops 996.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including." when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

The invention claimed is:

1. A computer-implemented method for configuring a reconfigurable hardware device to execute a user application, the computer-implemented method comprising:
    providing, on the reconfigurable hardware device, static shell logic controlled by a primary management core (PMC) for managing operation of the device, the static shell logic having a predetermined hardware interface;
    configuring, on the reconfigurable hardware device, via the PMC, dynamic shell logic for implementing dynamically-selected shell functionality, the dynamic shell logic including a secondary management core (SMC), adapted to communicate with the PMC via the hardware interface, for managing operation of the dynamic shell logic, wherein the PMC configures decoupling logic on the reconfigurable hardware device to decouple the dynamic shell logic from the static shell logic; and
    configuring, on the reconfigurable hardware device, via the PMC, application logic, having an interface with the dynamic shell logic, for executing the user application, wherein the SMC uploads to the PMC dynamic code to adapt the PMC for use with the dynamic shell logic, and wherein the PMC configures decoupling logic on the reconfigurable hardware device to decouple the application logic from the shell logic.

2. The computer-implemented method of claim 1, wherein the PMC is provided in the static shell logic on the reconfigurable hardware device.

3. The computer-implemented method of claim 1, wherein the PMC is provided by a processor operatively coupled to the reconfigurable hardware device.

4. The computer-implemented method of claim 1, wherein the dynamic code is uploaded to a code library of the PMC, the method further comprising, in the PMC during execution of the user application, using dynamic code in the code library to generate instructions adapting the PMC for use with the dynamic shell logic.

5. The computer-implemented method of claim 4, wherein the instructions comprise primary commands, for execution by the PMC, and secondary commands for execution by the SMC using the dynamic shell logic, and wherein the PMC forwards secondary commands to the SMC via the hardware interface.

6. The computer-implemented method of claim 4, wherein the PMC selects dynamic code for generating instructions in dependence on content of an input request received by the PMC during execution of the user application.

7. The computer-implemented method of claim 1, wherein the static shell logic includes a network interface for connecting the reconfigurable hardware device to a network, and wherein the PMC configures the dynamic shell logic and the application logic in response to a configuration request received from the network.

8. The method computer-implemented of claim 1 including configuring the static shell logic on the reconfigurable hardware device.

9. A computing apparatus for executing a user application, the apparatus comprising a reconfigurable hardware device and a primary management core (PMC) for managing operation of the reconfigurable hardware device, the reconfigurable hardware device comprising:
    static shell logic, controlled by the PMC, having a predetermined hardware interface;
    dynamic shell logic, configured dynamically via the PMC, for implementing dynamically-selected shell functionality, the dynamic shell logic including a secondary management core (SMC), adapted to communicate with the PMC via the hardware interface, for managing operation of the dynamic shell logic, wherein the PMC is adapted to configure decoupling logic on the reconfigurable hardware device to decouple the dynamic shell logic from the static shell logic; and
    application logic, configured dynamically via the PMC and having an interface with the dynamic shell logic, for executing the user application, wherein the SMC is operable to upload to the PMC dynamic code to adapt the PMC for use with the dynamic shell logic, and wherein the PMC is adapted to configure decoupling logic on the reconfigurable hardware device to decouple the application logic from the shell logic.

10. The computing apparatus of claim 9, wherein the PMC is provided in the static shell logic on the reconfigurable hardware device.

11. The computing apparatus of claim 9, wherein the PMC is provided by a processor operatively coupled to the reconfigurable hardware device.

12. The computing apparatus of claim 9, wherein the PMC is adapted to:

upload the dynamic code to a code library of that core; and during execution of the user application, to use dynamic code in the code library to generate instructions adapting the PMC for use with the dynamic shell logic.

13. The computing apparatus of claim 12, wherein the instructions comprise primary commands, for execution by the PMC, and secondary commands for execution by the SMC using the dynamic shell logic, and wherein the PMC is adapted to forward secondary commands to the SMC via the hardware interface.

14. The computing apparatus of claim 12, wherein the PMC is adapted to select dynamic code for generating instructions in dependence on content of an input request received by the PMC during execution of the user application.

15. A computer program product for configuring a computing apparatus to execute a user application, the computing apparatus comprising a reconfigurable hardware device and a primary management core (PMC) for managing operation of the reconfigurable hardware device, wherein the reconfigurable hardware device comprises static shell logic, controlled by the PMC, having a predetermined hardware interface, and wherein the computer program product comprises a computer readable storage medium having program instructions embodied therewith, the program instructions being executable by the computing apparatus to cause the computing apparatus to:

configure, on the reconfigurable hardware device via the PMC, dynamic shell logic for implementing dynamically-selected shell functionality, the dynamic shell logic including a secondary management core (SMC), adapted to communicate with the PMC via the hardware interface, for managing operation of the dynamic shell logic, wherein the PMC is adapted to configure decoupling logic on the reconfigurable hardware device to decouple the dynamic shell logic from the static shell logic; and configure, on the reconfigurable hardware device via the PMC, application logic having an interface with the dynamic shell logic for executing the user application, wherein the SMC is operable to upload to the PMC dynamic code to adapt the PMC for use with the dynamic shell logic, and wherein the PMC is adapted to configure decoupling logic on the reconfigurable hardware device to decouple the application logic from the shell logic.

16. The computer program product of claim 15, wherein the PMC is provided in the static shell logic on the reconfigurable hardware device.

17. The computer program product of claim 15, wherein the PMC is adapted to:

upload the dynamic code to a code library of that core; and during execution of the user application, to use dynamic code in the code library to generate instructions adapting the PMC for use with the dynamic shell logic.

18. The computer program product of claim 17, wherein the instructions comprise commands, for execution by the PMC, and secondary commands for execution by the SMC using the dynamic shell logic, and wherein the PMC is adapted to forward secondary commands to the SMC via the hardware interface.

* * * * *